July 31, 1956 M. A. KENDALL ET AL 2,756,686
TRANSPORTATION APPARATUS
Filed Oct. 20, 1950 6 Sheets-Sheet 1
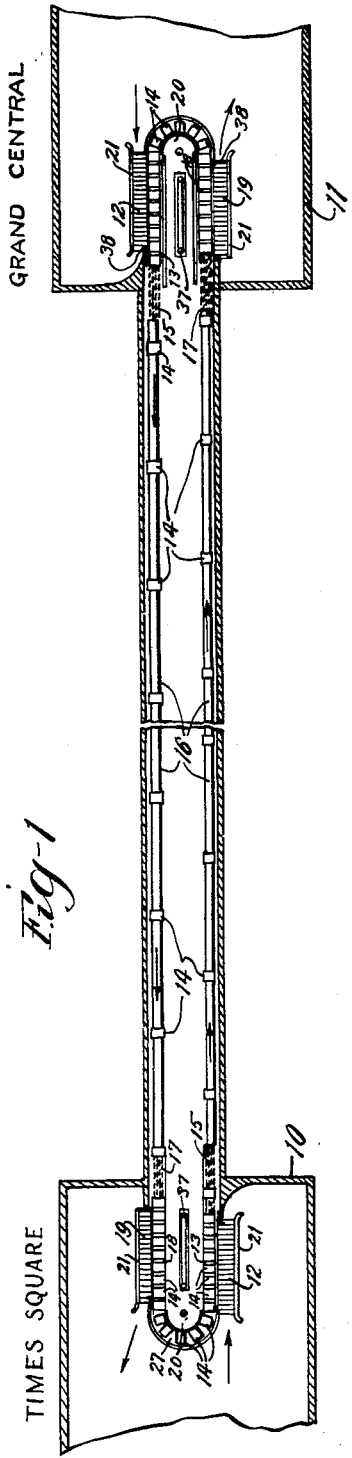
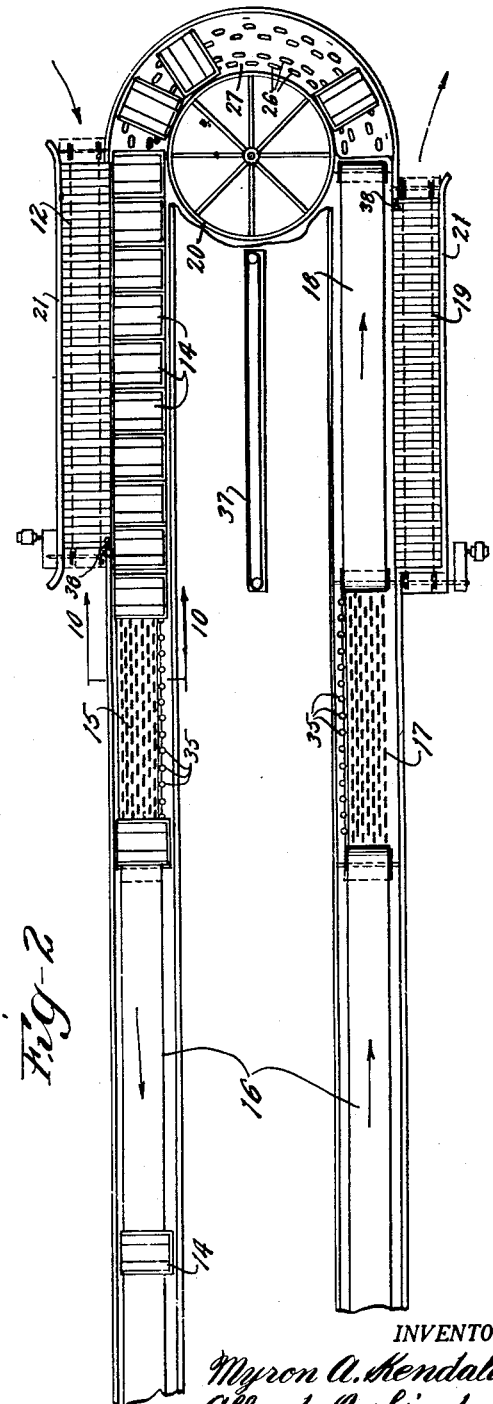
INVENTORS.
Myron A. Kendall &
Alfred D. Sinden July 31, 1956  M. A. KENDALL ET AL  2,756,686
TRANSPORTATION APPARATUS
Filed Oct. 20, 1950  6 Sheets-Sheet 2
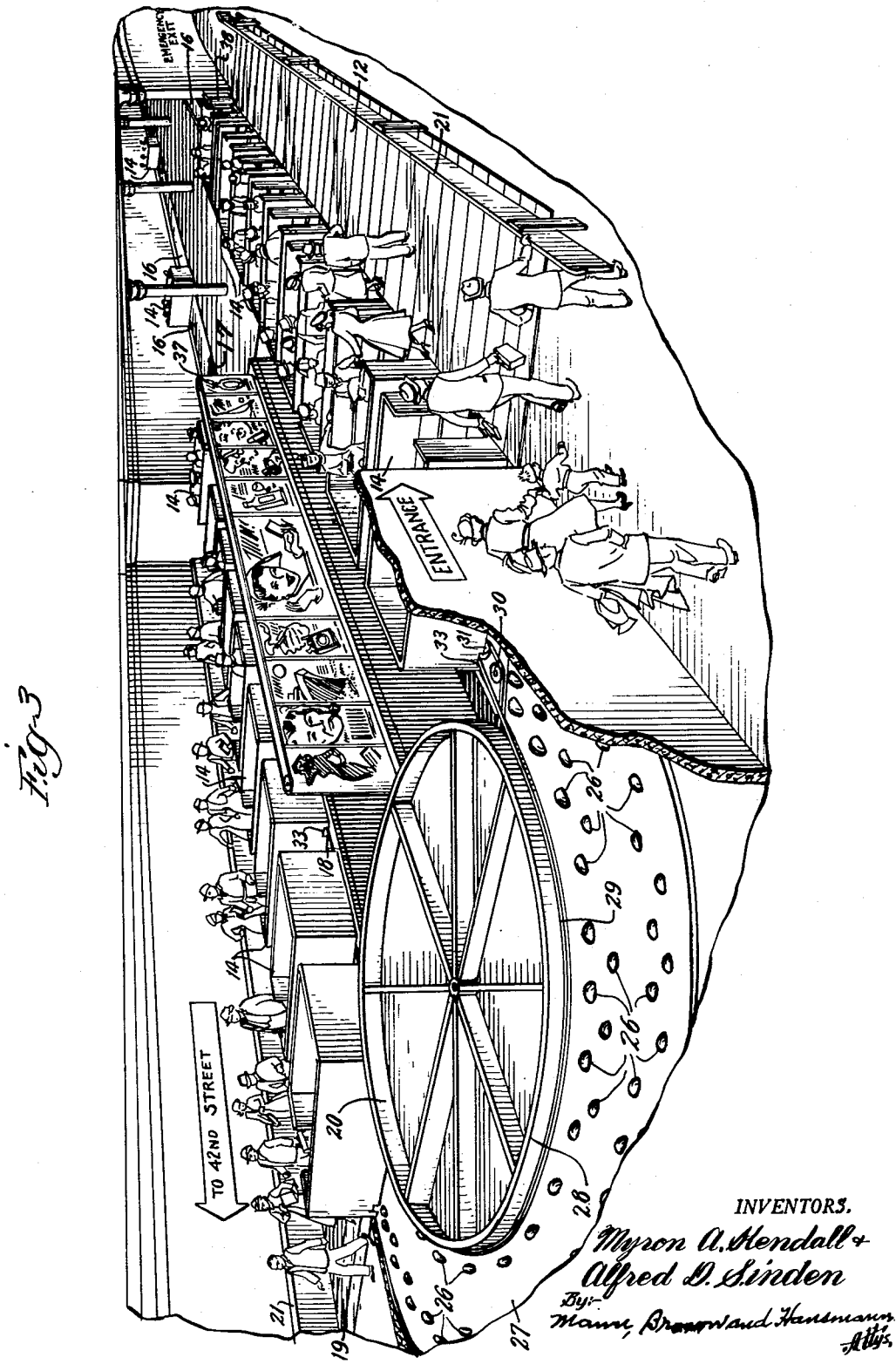
INVENTORS.
Myron A. Kendall &
Alfred D. Sinden
By:- Mann, Brown and Hausmann
Attys.

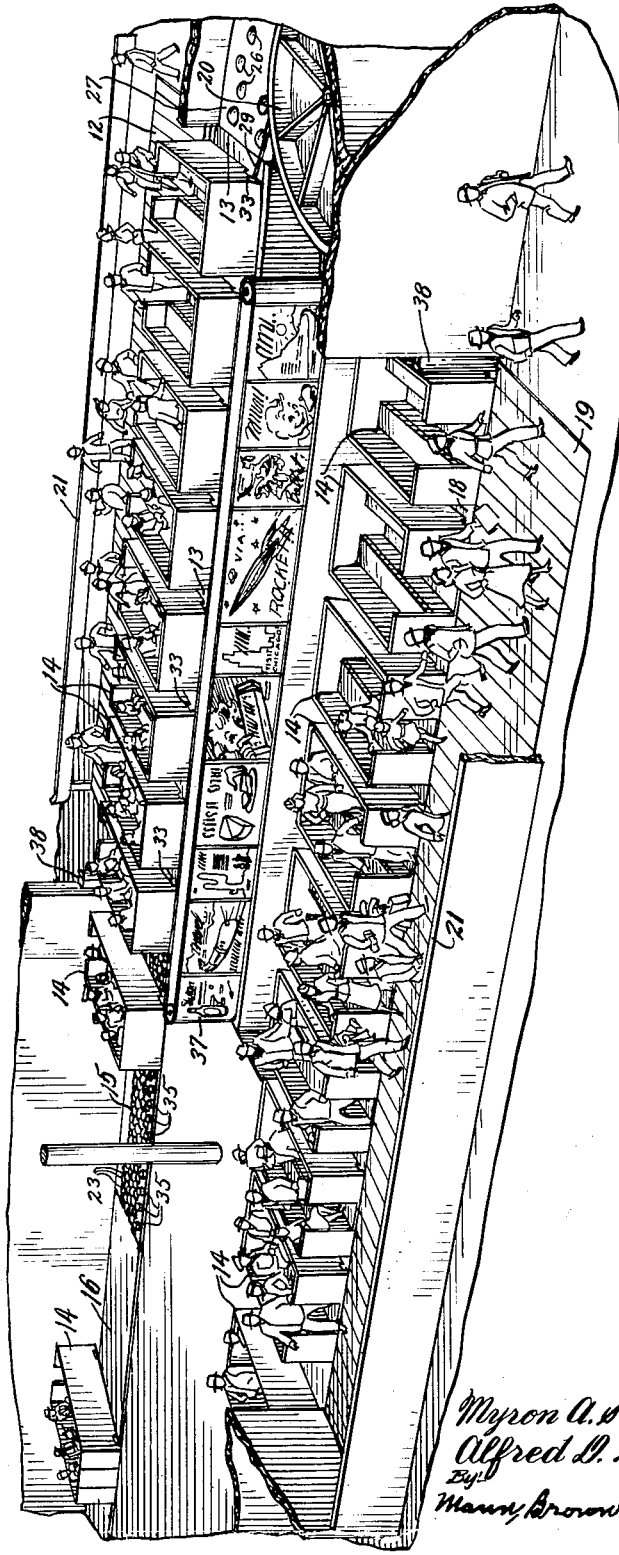

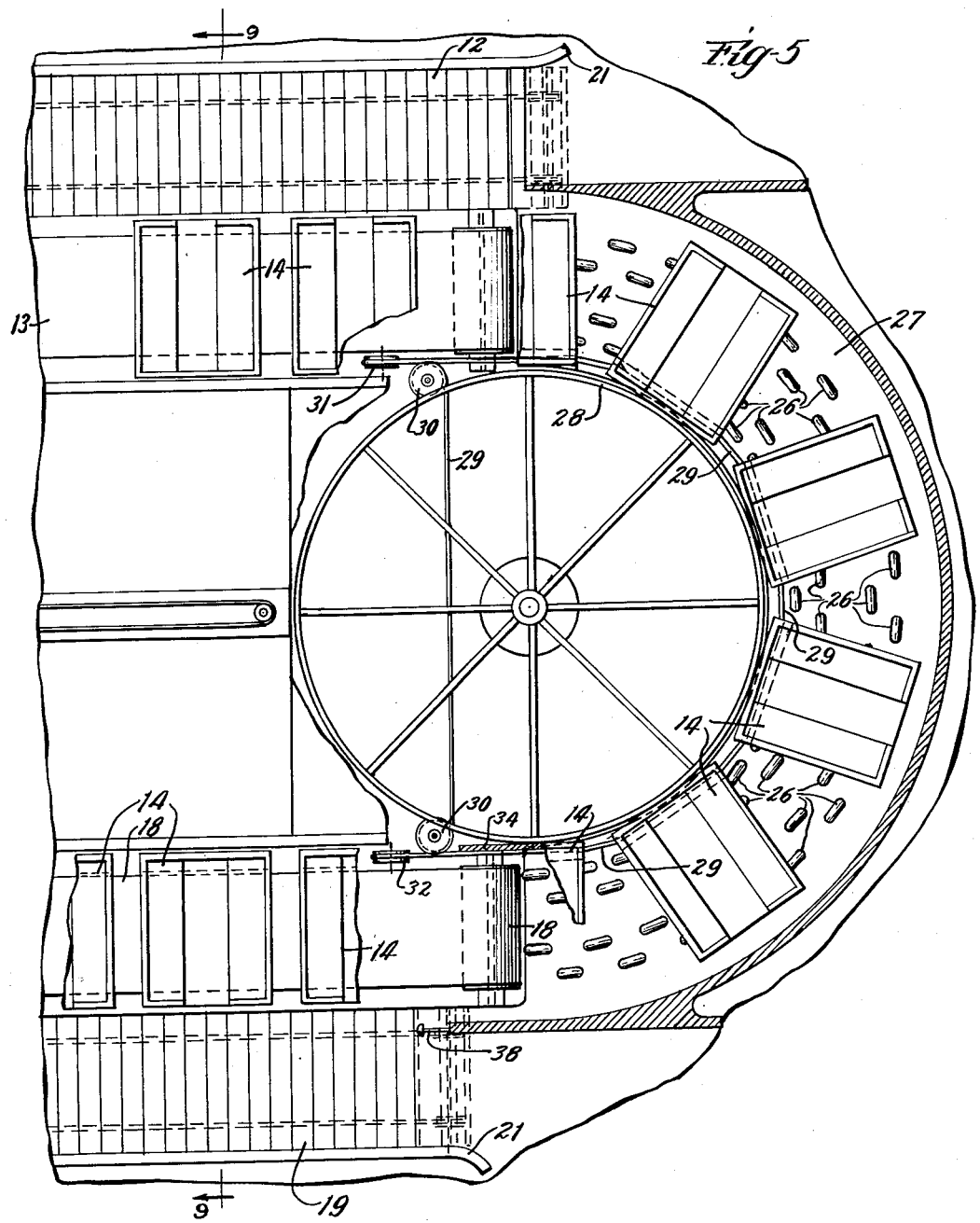

July 31, 1956  M. A. KENDALL ET AL  2,756,686
TRANSPORTATION APPARATUS
Filed Oct. 20, 1950  6 Sheets-Sheet 5
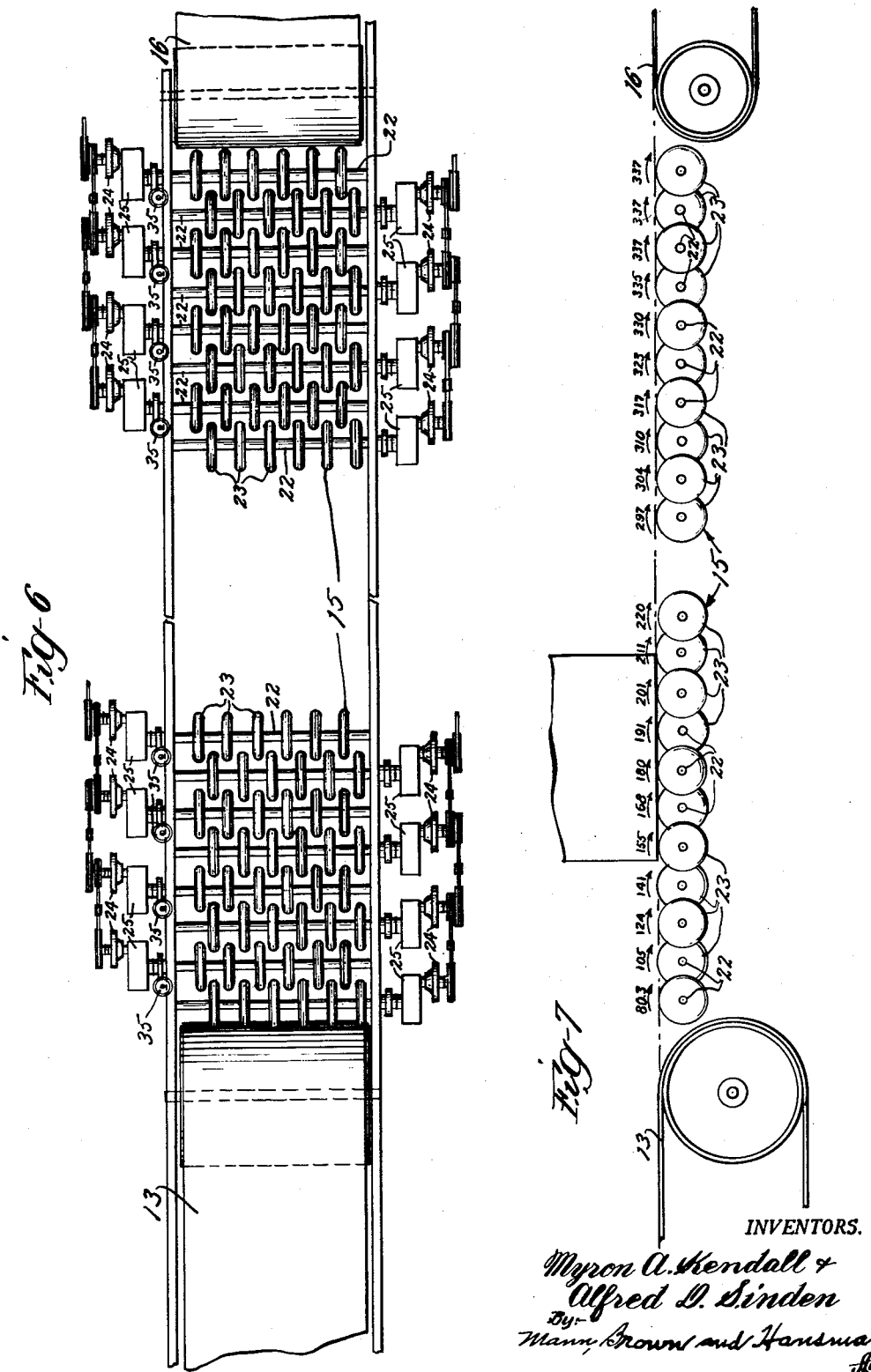
INVENTORS.
Myron A. Kendall &
Alfred D. Sinden
By-
Mann, Brown and Hausmann
Attys.

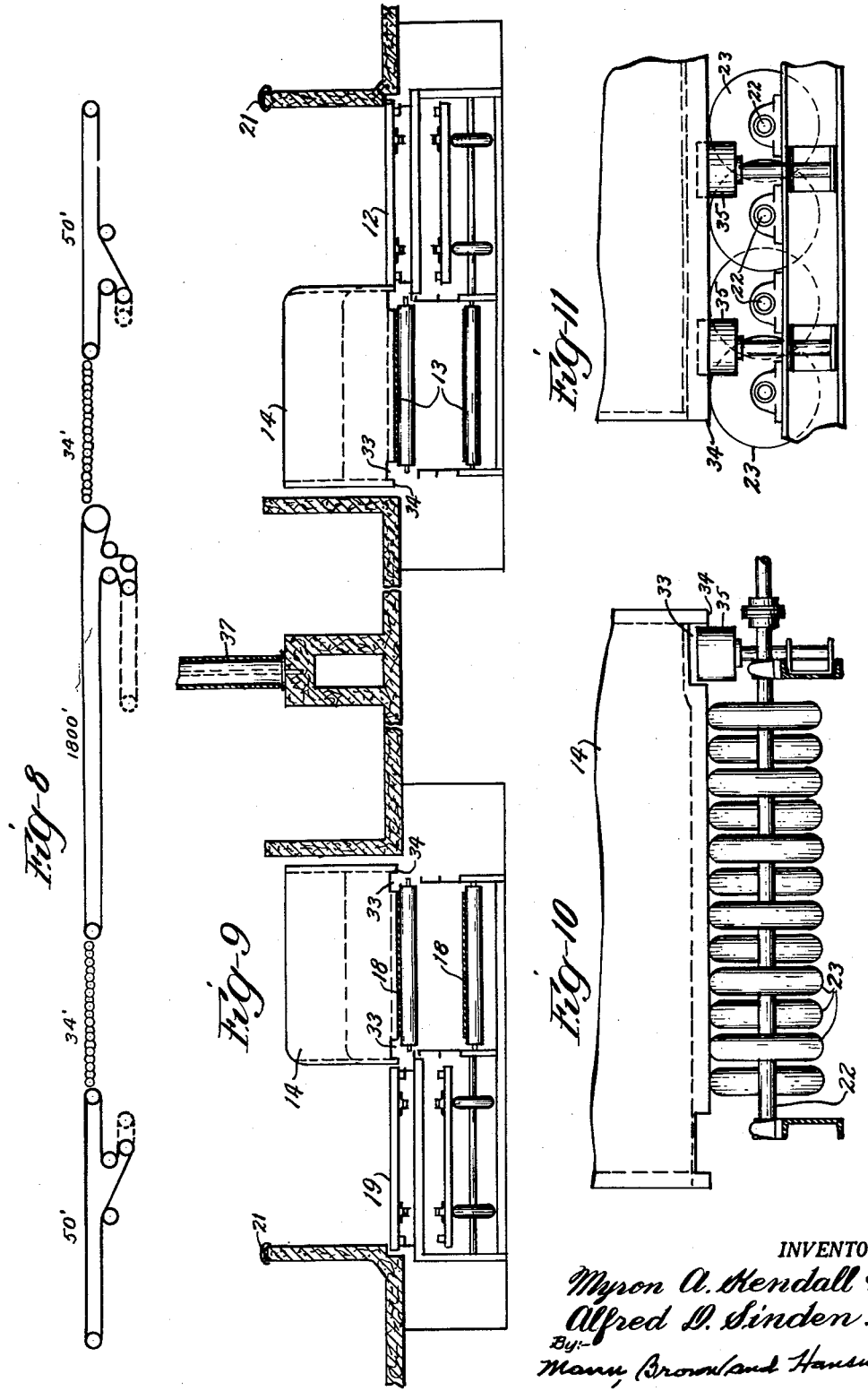

United States Patent Office 2,756,686
Patented July 31, 1956

2,756,686

TRANSPORTATION APPARATUS

Myron A. Kendall and Alfred D. Sinden, Aurora, Ill., assignors to Stephens-Adamson Mfg. Co., a corporation of Illinois Application October 20, 1950, Serial No. 191,274

8 Claims. (Cl. 104—25)

Rush hour, batch loading, city passenger transportation falls short of requirements in comfort, safety, speed, and economy. Many have recognized the condition and sought to remedy it without success.

The principal object of this invention is to provide an improved method and apparatus that will meet the requirements under all ordinary conditions. Generally speaking, this is accomplished by providing continuous loading at low speed with continuous transport at high speed and continuous unloading at low speed. In most instances also, there is a complete separation between passengers entering the system and those leaving.

In the main, the apparatus or machine for taking passengers in one direction from one point to another includes a main, high-speed conveyor, two low-speed auxiliary conveyors, one rearwardly of, and the other forwardly of the main conveyor, a loading platform alongside, close to and moving at approximately the same speed and in the same direction as the rear auxiliary conveyor, and an accelerating conveyor receiving from the rear auxiliary conveyor and delivering to the main conveyor, a decelerating conveyor receiving from the high speed conveyor and delivering to the forward auxiliary conveyor, and an unloading platform alongside adjacent to and moving at approximately the same speed and in the same direction as the forward auxiliary conveyor.

For return, this apparatus is, or may be, duplicated in the reverse direction.

A series of independent cabs travel in circuit along the conveyors, bunched at the loading and unloading platforms and strung out on the main high-speed conveyors. They are readily transferred from the unloading place on one run to the loading place on the opposite run by a drum or wheel device. It is significant that the cabs are completely independent of each other and are "non-synchronized" with respect to the conveyors in the sense that they merely rest upon the conveyors, are not physically attached thereto, and depend upon traction forces for their propulsion by the conveyors.

The preferred embodiment of a simple apparatus or machine is shown diagrammatically in the accompanying drawings, in which:

Fig. 1 is a plan view of apparatus or a machine which might be used, for instance, to replace the shuttle subway between the Times Square and the Grand Central Stations;

Fig. 2 is an enlargement of the right end of the apparatus shown in Fig. 1, with some of the cabs omitted for clarity of illustration;

Fig. 3 is a perspective view of the left end of the apparatus shown in Fig. 1, with some of the cabs omitted for clarity of illustration;

Fig. 4 is a perspective view of the right end of Fig. 1;

Fig. 5 is a large plan view of the right end of Fig. 1 showing the transfer device for taking cars from an unloading conveyor and putting them on a loading conveyor at the opposite side, with parts broken away for clarity of illustration;

Fig. 6 is a plan view of a speed adjusting conveyor, in this instance, an accelerating conveyor;

Fig. 7 is a side elevation of the same;

Fig. 8 is a diagrammatic side elevation of the several conveyors forming the eastgoing part of Fig. 1;

Fig. 9 is a section on the line 9—9 of Fig. 5;

Fig. 10 is a section on the line 10—10 of Fig. 2; and

Fig. 11 is a side elevation looking at the right of Fig. 10.

But these drawings and the corresponding description are used for the purpose of disclosure only.

In the plan view (Fig. 1), there is a station 10 that may be, for instance, the Times Square Station in New York City and a station 11 that may be the Grand Central Station.

The apparatus or machine for taking passengers eastward includes a moving loading platform 12 alongside, close to and moving at approximately the same speed and in the same direction as a rear auxiliary conveyor 13 bearing closely bunched cabs 14 and delivering to an accelerating conveyor 15, which, in turn, delivers the cabs in open order to the main high speed conveyor 16, traversing the major portion of the distance between the stations. The main conveyor 16 delivers to a decelerating conveyor 17, which, in turn, delivers to a forward auxiliary unloading conveyor 18 bearing the bunched cabs 14 and alongside, close to and moving at approximately the same speed, and in the same direction as the auxiliary conveyor 18, is an unloading platform 19.

A transfer device, or car turn-around, generally indicated by 20, receives the cabs from the auxiliary unloading conveyor 18, turns them, and delivers them to an auxiliary loading conveyor 13 corresponding to that just mentioned but belonging to a duplicate set of conveyors for taking passengers westward, which ends in another transfer device 20 for turning the cabs and delivering them back to the first mentioned auxiliary loading conveyor 13.

The arrangement at the right end of Fig. 1 is somewhat more clearly brought out by the enlargements (Figs. 2 and 5).

The moving loading platforms 12 and unloading platforms 19 are here illustrated as on the order of the familiar escalators in common use, except that there is no considerable change in elevation, and it is contemplated that in the ordinary conditions they will operate on a level. They may be equipped with moving hand rails 21 of conventional form and run at a speed of approximately 1½ miles an hour (about one-half average walking speed), as is customary with escalators, that speed having been found safe and comfortable in practice.

The accelerating conveyors 15 are illustrated as live roll tables (Figs. 6 and 7) made up of shafts 22 each having a plurality of rubber-tired rollers 23. Each shaft is driven independently through a fluid coupling or drive 24 and a speed reducer 25 and at different speeds from the others, such as indicated by the numerals on Fig. 7 (which represent revolutions per minute). In this way, the cabs 14 received from the auxiliary loading conveyor at 1½ miles an hour are stepped up gradually and smoothly to 15 miles an hour, and delivered to the main high speed conveyor 16. Those speeds are optional.

The decelerating conveyors 17 are similar to the accelerating conveyors just described in connection with Figs. 6 and 7, except that the relative speeds of the series of rubber-tired rollers is reversed in order to step the cabs down from 15 miles an hour to 1½ miles per hour, and deliver them to the auxiliary unloading conveyor 18. These speed adjusting conveyors are more particularly described and claimed in our continuation-in-part application Serial No. 230,398, filed June 7, 1951, now Patent No. 2,701,049, granted February 1, 1955.

The transfer devices 20 include rollers 26 arranged in a circular passageway 27 (Fig. 5) and associated with a wheel or drum 28 driven by a rope 29 running over guide pulleys 30, a drive sheave 31, and a take-up 32.

As shown in Fig. 9, the bottom of each cab 14 is provided with a channel-shaped guideway 33 at each side. The outer wall 34 on the inner side of each cab will be caught by the rope 29, as shown in Fig. 5, when the cab comes into the appropriate position, and held to or against the drum or wheel 28. The powered rope 29 thus binds the individual cabs against wheel 28, whereby they are positively moved around to the opposite side of the apparatus, released at the point where rope 29 is drawn away from wheel 28, and delivered to the auxiliary loading platform.

As appears best in Figs. 10 and 11, the guides 33 of each car receive vertical guide rollers 35 distributed along the side of the accelerating and decelerating conveyors to hold the cabs in proper alignment as they pass over the rubber-tired rollers 23.

In operation, there is continuous loading at each station in cabs bunched in close order on the auxiliary loading conveyor moving at the same, or substantially the same, speed as the loading platform. There is also continuous acceleration from the low speed of the loading conveyor to the high speed of the main conveyor, where the cars are in open order, distributed at a considerable distance from each other until they reach the decelerating conveyor, when they are bunched again and there is continuous unloading on the moving platform at that end. An appropriate number of cabs fills the circuit and the dispatching is automatic.

A passenger enters, as shown in Fig. 3, by stepping on the loading platform 12, and may, if he chooses, make use of the moving hand rail 21, as is customary with escalators. The passenger moves along with the platform and walks toward a cab 14 in much the same way as a passenger walks along the aisle of a car to his seat. Selecting a cab, the passenger enters and sits down. The cabs and the loading platform being at substantially the same speed, there is no confusion or problem in transferring to the cabs; and, to preserve that condition, an endless screen 37 may move alongside the auxiliary loading conveyor at the same speed. After being seated, or in the case of an extraordinary number of passengers with a few standing in the cabs, each cab is easily stepped up from the low speed of the loading conveyor to the high speed of the main conveyor, and the operation proceeds until the station at the other end is reached, when the cabs are slowed down, automatically bunched, and moved alongside the unloading platform at substantially the same speed that said platform moves so that the passengers discharge without difficulty, just as they do at the end of an escalator.

The loading platforms are open at both ends, so that a passenger who fails to get into a cab or changes his mind may walk off the end opposite to that which he entered.

As a safety measure, adjacent to the end of the loading and unloading platforms a spring bumper 38 with automatic shut-off is provided to the end that, if a passenger is unduly careless and would otherwise be caught between a cab and the adjacent wall or frame, the apparatus will stop until he is cleared.

In the apparatus here shown for replacing the shuttle cars between the Times Square Station and the Grand Central Station, each auxiliary loading conveyor is on the order of 50 feet long; each accelerating and decelerating conveyor is on the order of 34 feet long; and each main conveyor is on the order of 1800 feet long.

Each cab is intended to hold eight passengers and to travel on the conveyors in series, as indicated. The cabs at the loading point are intended to be spaced about 6 inches apart and to provide continuous loading with 25 cabs passing the loading point every minute, thus giving a capacity of 12,000 seated passengers per hour. Of course, that can be increased by having eight seated and one or two standing, or by increasing the size.

The continuous loading with such capacity prevents the tremendous crowding with the present system of batch loading and provides faster transportation between two stations with the passengers comfortably seated, except on rare occasions, when only a few stand. There is no danger of passengers falling in front of trains or stepping on third rails. The conveyors are trustworthy mechanisms that have demonstrated their performance in industry for years, and they are low in first cost and low in maintenance as compared with batch loading equipment.

No attendants corresponding to train crews are required.

The simple arrangement shown and described illustrates fundamentals only. Intermediate stations and such like will be made readily to suit conditions. An intermediate station may be inserted in one line only without disturbing the automatic timing and dispatch of cabs.

We claim:

1. In a passenger transportation apparatus, a closed circuit comprising continuous, varying speed, transport surfaces including a low speed loading conveyor, an accelerating conveyor, a high speed conveyor, a decelerating conveyor, and a low speed unloading conveyor, all of which conveyors are continuously operating and arranged in series in that order, a plurality of separate independent cabs mounted for movement in said circuit on said series of conveyors in non-synchronized relationship thereto, there being a sufficient number of cabs in said circuit such that cabs are removed from the delivery end of said unloading conveyor and delivered to the receiving end of said loading conveyor at a rate such that there are a plurality of cabs on the loading conveyor at all times for the continuous loading of passengers.

2. The apparatus set forth in claim 1, wherein said closed circuit includes one or more additional series of conveyors, each including a low speed loading conveyor, an accelerating conveyor, a high speed conveyor, a decelerating conveyor, and a low speed unloading conveyor, all continuously operating and arranged in series in that order.

3. The apparatus set forth in claim 2, wherein said closed circuit also includes a cab turn-around device interposed between the ends of a first and second series of conveyors, said cab turn-around devices each comprising a wheel mounted for rotation about a vertical axis and positioned at a point equidistant between the respective ends of said first and second series of conveyors, roller means radially arranged about the periphery of said wheel and connecting the respective ends of said first and second series of conveyors, and power means for conveying said cabs between the respective ends of said first and second series of conveyors about the periphery of said wheel.

4. In a continuously operating automatic transportation apparatus for transporting passengers between a loading station and an unloading station, a closed circuit comprising continuous, varying speed, transport surfaces including a low speed loading conveyor at the loading station, an accelerating conveyor, a high speed conveyor, a decelerating conveyor, and a low speed unloading conveyor at the unloading station, all of which conveyors are continuously operating and arranged in series in that order, a plurality of separate independent cabs mounted on, and in non-synchronized relationship to said transport surfaces, and having their movements controlled thereby, there being a sufficient number of cabs in said circuit such that cabs are removed from the delivery end of said unloading conveyor and delivered to the receiving end of said loading conveyor at a rate such that there is a substantially continuous line of juxtaposed cabs traversing the loading conveyor at all times, whereby passengers may be continuously loaded for transportation on said apparatus between said stations.

5. The apparatus set forth in claim 4, wherein the loading and unloading stations include a moving platform positioned alongside and close to the respective low speed conveyors, said moving platforms each moving at substantially the same speed as said respective low speed conveyors.

6. Transportation apparatus for transporting passengers between a loading station and an unloading station, comprising an endless circuit extending between said stations, said circuit comprising a series of continuously operating conveyors arranged end to end, a plurality of separate and independent passenger cabs conveyed by said conveyors and traveling about said circuit, said passenger cabs resting directly on and being carried by the respective conveyors as said cabs are moved by said conveyors, respectively, but in non-synchronized relationship thereto, said series of conveyors including a low speed loading conveyor positioned adjacent the loading station, a low speed unloading conveyor positioned adjacent the unloading station, a high speed conveyor positioned between said low speed conveyors, and speed adjusting conveyors connecting said low and high speed conveyors, and means for moving said cabs between the cab delivering end of said unloading conveyor and the cab receiving end of said loading conveyor, said cabs being sufficient in number to substantially fill said circuit so that at low speed adjacent cabs are positioned closely adjacent each other, whereby a continuous line of juxtaposed cabs is traversing the low speed conveyors at all times.

7. The transportation apparatus set forth in claim 6, wherein a moving platform is positioned alongside the respective low speed conveyors, said moving platforms moving at substantially the same speed and in the same direction as the respective low speed conveyors.

8. Transportation apparatus comprising an endless circuit extending between loading and unloading stations, a plurality of separate and independent cabs continuously traversing said circuit, said circuit comprising conveying means for conveying and supporting the individual cabs independently of each other and in non-synchronized relation to said conveying means, said conveying means including low speed conveyors at the loading and unloading stations, a high speed conveyor intermediate the low speed conveyors, and speed adjusting conveyors intermediate the high speed conveyor and the low speed conveyors, all of said conveyors being disposed in end to end relationship, whereby said conveying means moves said cabs past said stations at low speeds and between said stations at high speed, said cabs being sufficient in number to substantially fill the circuit so that at low speed adjacent cabs are positioned closely adjacent each other, whereby a continuous line of juxtaposed cabs is at all times passing by both of said stations.

References Cited in the file of this patent

UNITED STATES PATENTS

| 935,631 | Adkins et al. | Oct. 5, 1909 |
| 1,102,231 | Begg | July 7, 1914 |
| 1,198,605 | Trent | Sept. 19, 1916 |
| 1,199,818 | Peck | Oct. 3, 1916 |
| 1,412,969 | Sachs | Apr. 18, 1922 |
| 1,615,453 | Hencken | Jan. 25, 1927 |
| 1,793,498 | L'Heritier | Feb. 24, 1931 |
| 1,823,010 | Traver | Sept. 15, 1931 |
| 2,044,134 | Storer | June 16, 1936 |

FOREIGN PATENTS

| 291,429 | England | Feb. 29, 1928 |